July 9, 1935. W. T. CARNES 2,007,639
AUTOMATIC PHONOGRAPH
Filed March 2, 1931 7 Sheets-Sheet 3
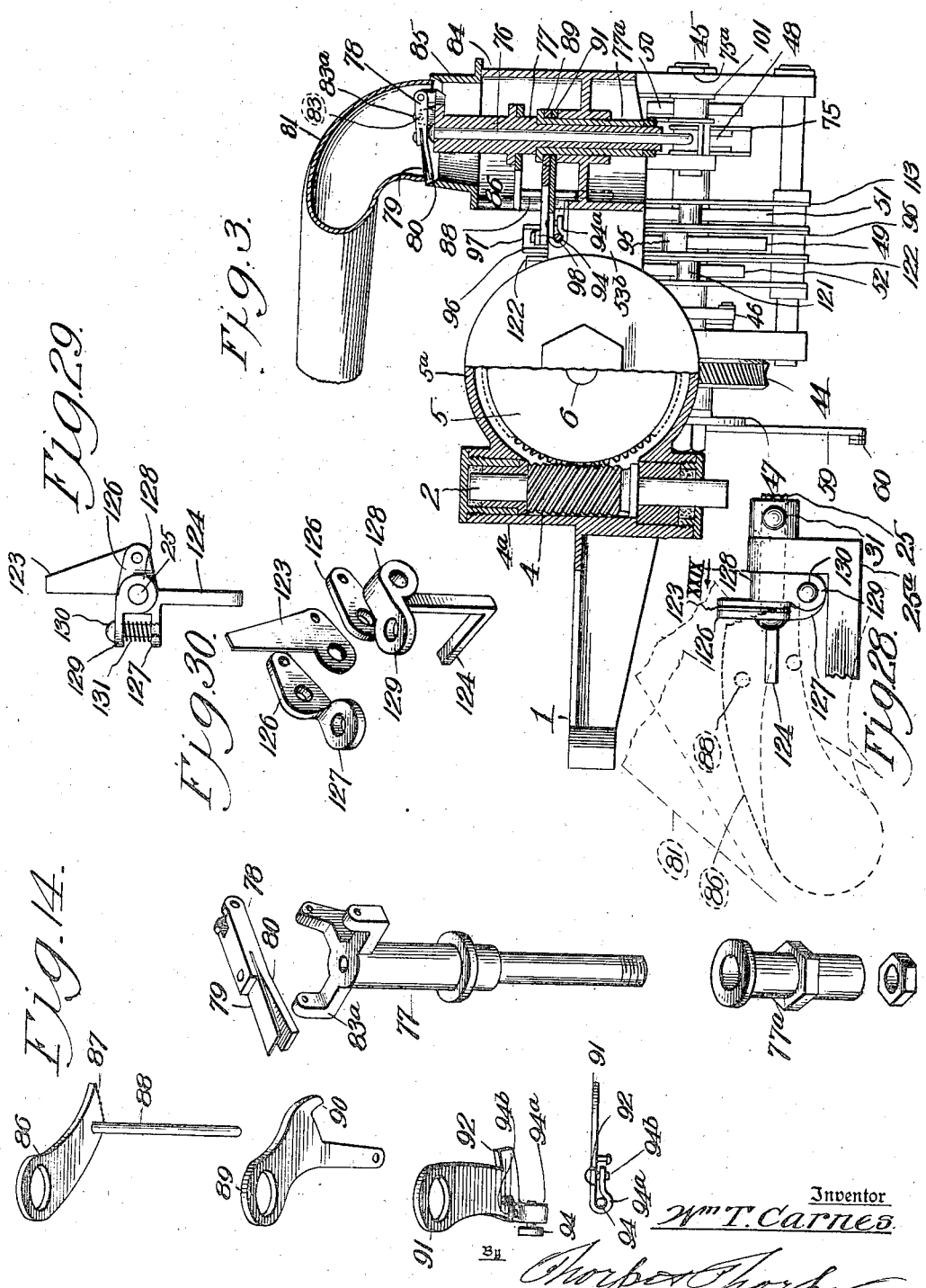
Inventor
Wm T. Carnes
By Thorpe & Thorpe
Attorneys

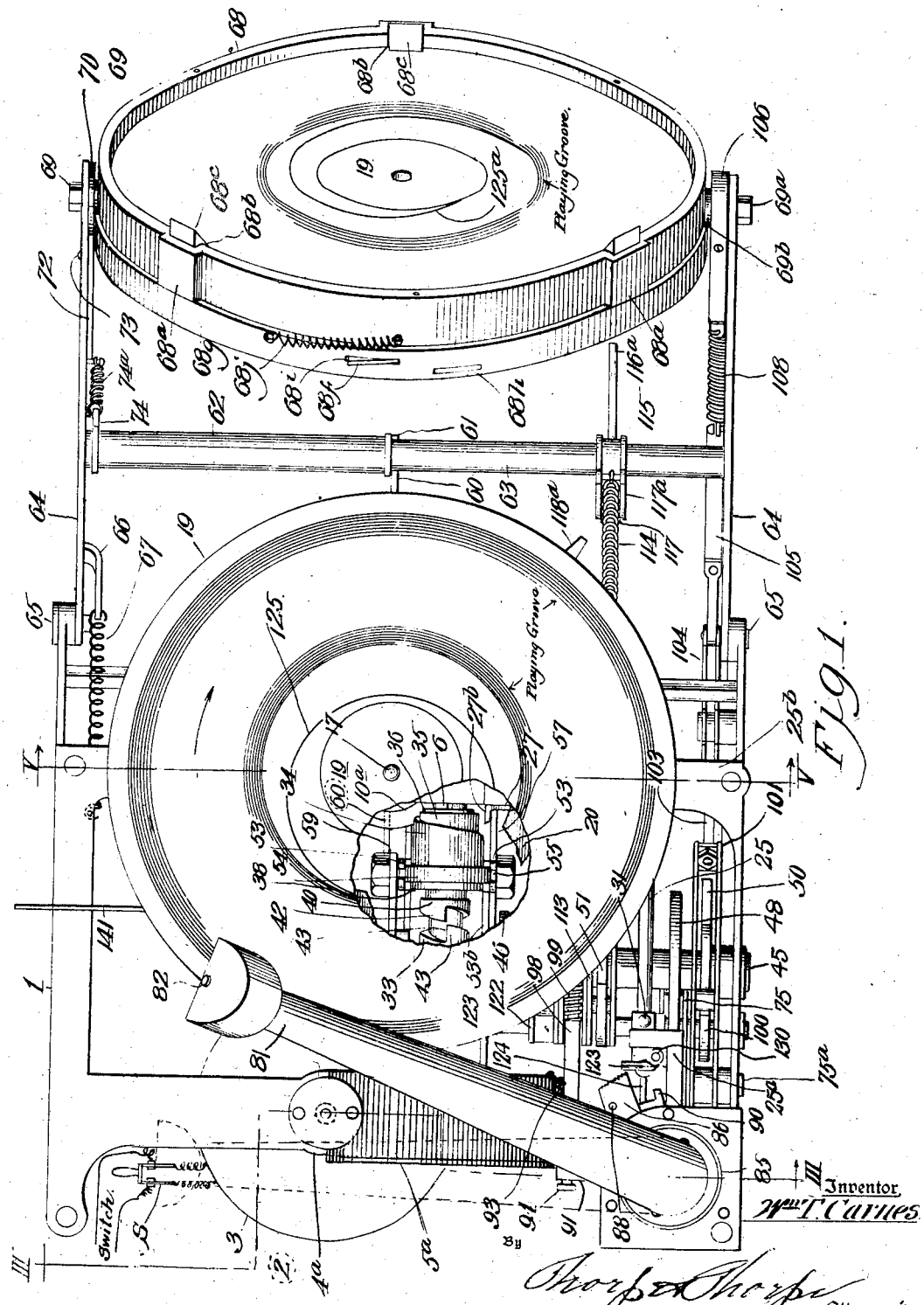

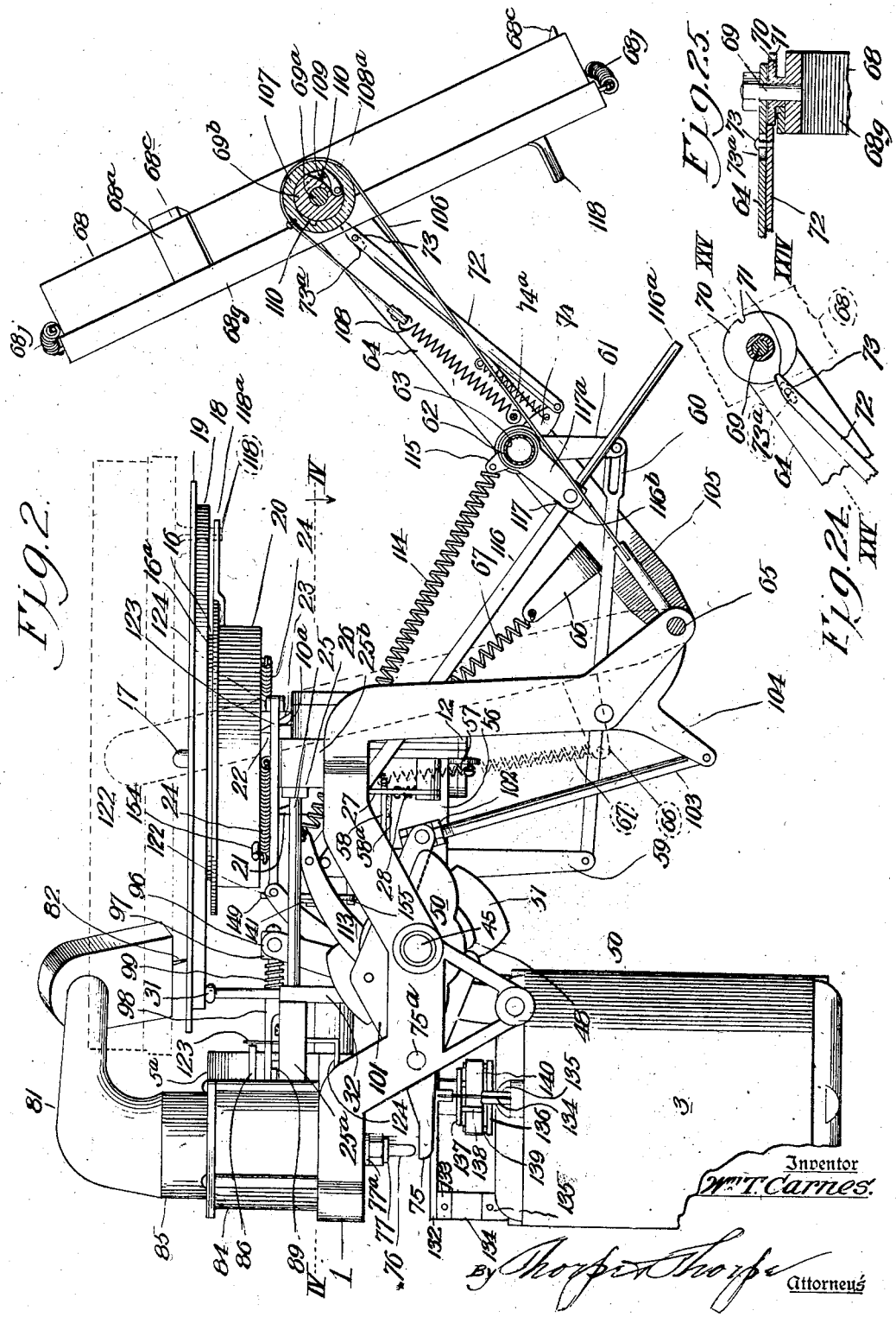

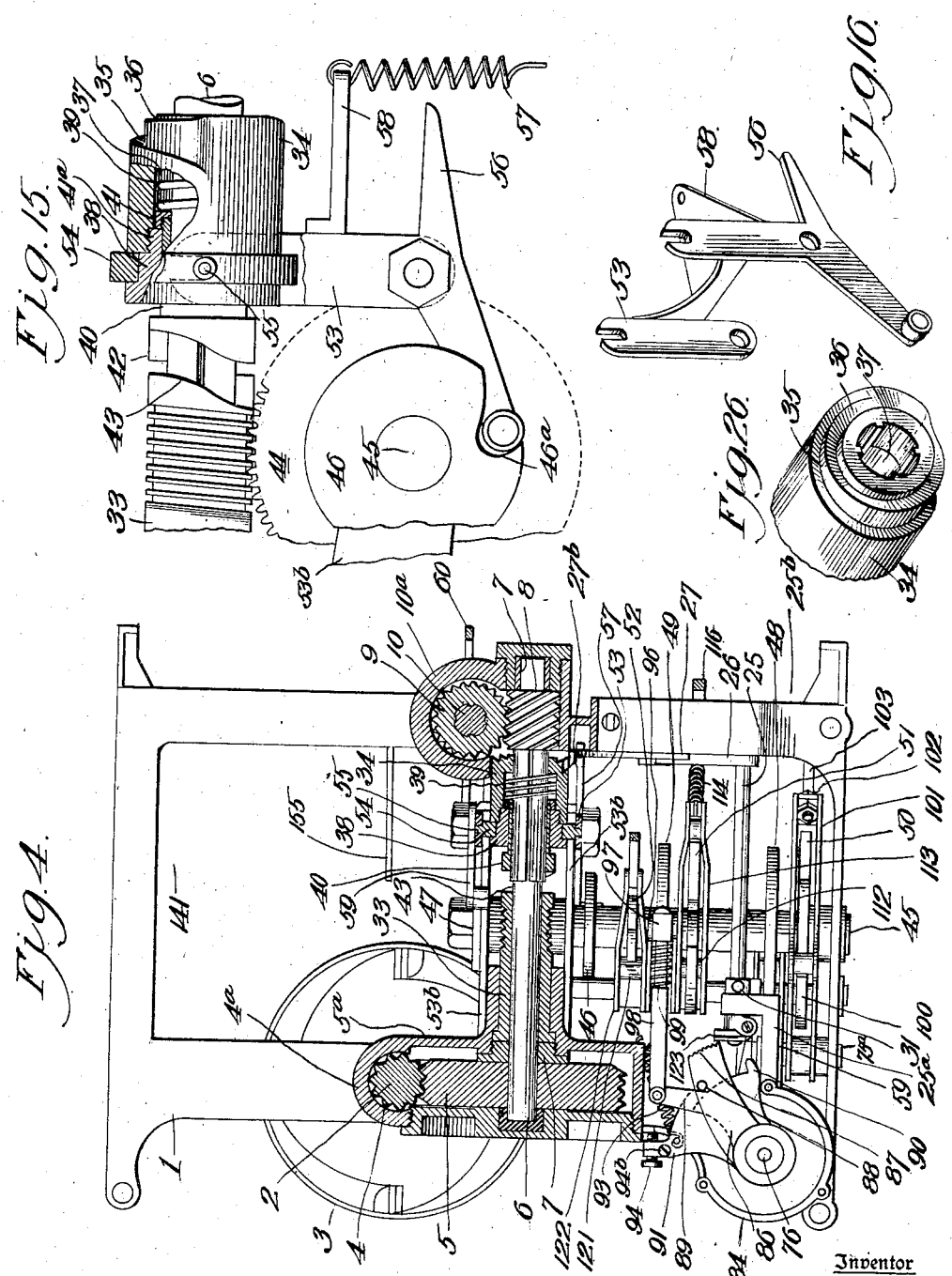

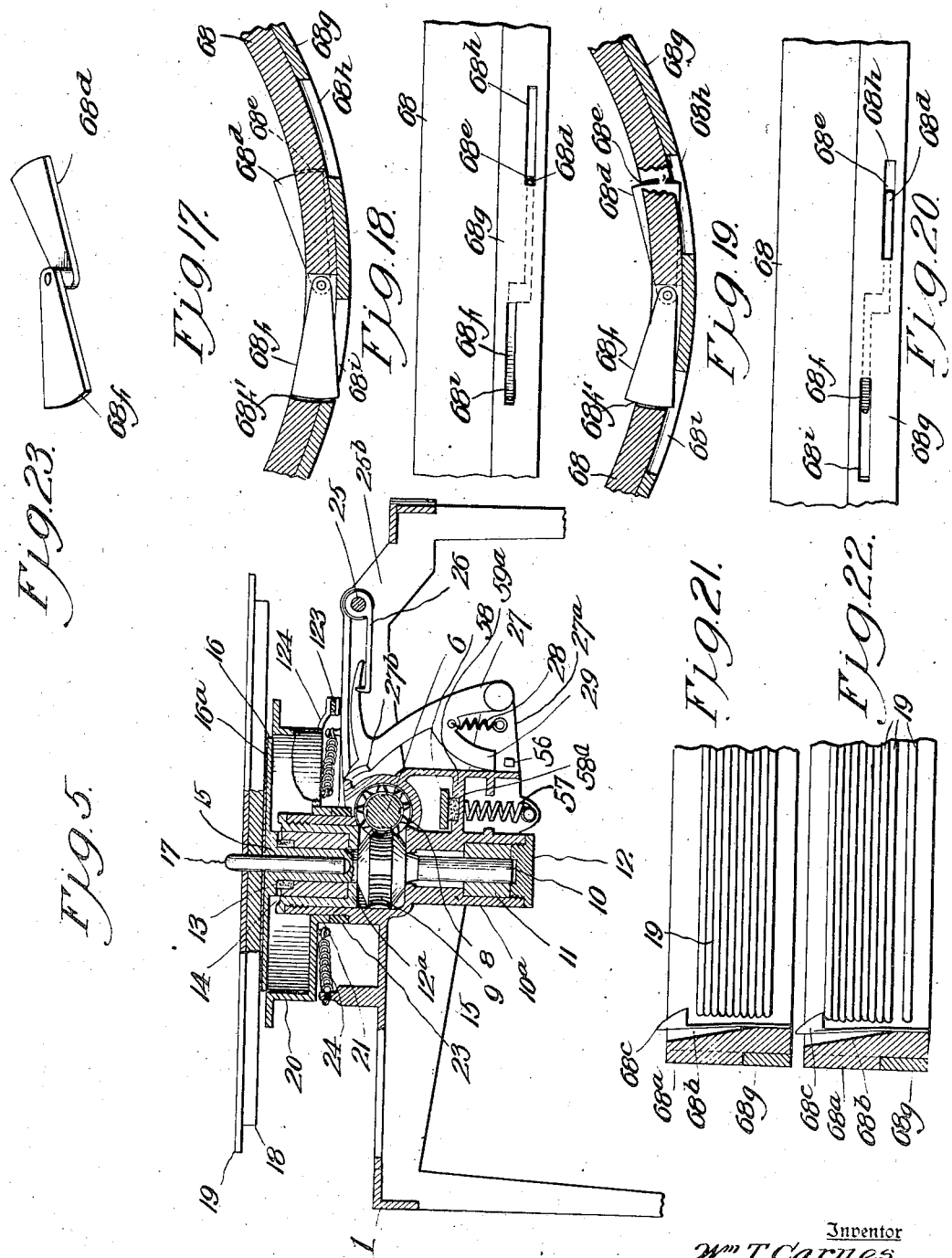

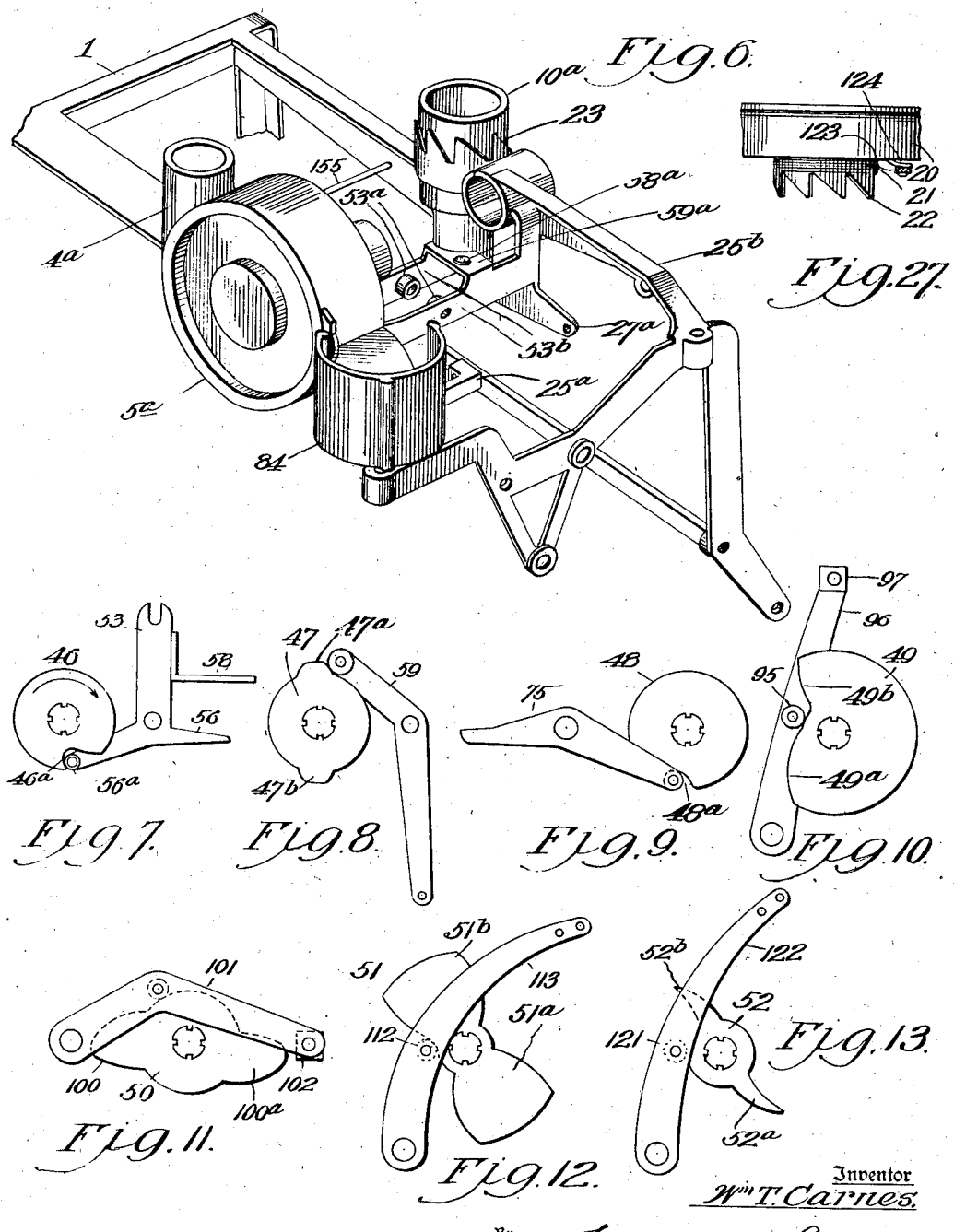

Inventor
Wm T. Carnes,
By
Attorneys

Patented July 9, 1935

2,007,639

UNITED STATES PATENT OFFICE 2,007,639

AUTOMATIC PHONOGRAPH

William T. Carnes, Kansas City, Mo., assignor to Carnes Artificial Limb Company, Kansas City, Mo., a corporation of Missouri Application March 2, 1931, Serial No. 519,515

54 Claims. (Cl. 274—10)

This invention relates to phonographs of that general class in which a series of records are successively and automatically placed on and removed from a turn table, and in which the needle is automatically disposed in operative relation to each record as the latter is deposited on the table and withdrawn from such relation as the "playing" of each record ends.

The primary object is to produce a machine of the class mentioned having a magazine for holding a stack of records and dropping the records one at a time, on a revolving disk, the magazine automatically removing each record after it is played, from the table. Another object is to provide a magazine for holding a stack of records, and for releasing and dropping them successively from the bottom of the stack, and after each record is played, for picking up and disposing the record at the other end of the stack, inverted as regards its original position so that when its turn arrives for a second playing, its originally unplayed face shall be engaged by the needle, this operation of the magazine making it possible to successively play all of a series of records on corresponding faces and then all of the records on the opposite faces.

A further object is to provide a magazine containing a stack of disk records, for swinging from normal position to a horizontal position above and spaced from a turn table, the magazine preliminary to such swinging movement, making a half turn around an axis diametric to the magazine, to bring its receiving side in proximity to the table when over the same, and then after picking up a record from a disk normally resting on the table, swinging back to normal position and making another half turn, to invert the stack of records so that upon the ensuing swing action to a position over the table, the delivery side of the magazine shall be in proximity to the said disk and the bottom record,—originally the second record from the bottom of the magazine,— shall be deposited on the table, these actions being repeated if the machine is left running, until all of the records have been successively deposited on the disk with the same side up and then in the same successive order, with the other side up.

Another object is to provide means whereby the attendant can effect premature operation of the mechanism controlling the magazine to cause the latter to remove a record from the turn table before it is played or before the playing of the record has been completed.

A further object is to provide a phonograph having a floating record-carrying disk which periodically and automatically assumes the load of all of the records employed when in vertically stacked position, and a switch to be manually set for automatically effecting the stoppage of the operation of the phonograph at the moment the disk assumes such load, this result being desirable as the disk will afford such flat and extended support that the records are prevented from warping, as so frequently results when the disks are subjected to summer-heat for a considerable period if not afforded a flat underlying support of considerable area.

With the general objects named in view and others as will hereinafter appear, the invention consists in certain novel and useful features of construction and organization of parts as hereinafter described and claimed; and in order that it may be fully understood, reference is to be had to the accompanying drawings, in which:—

Figure 1 is a plan view of an automatic phonograph embodying the invention.

Figure 2 is a rear view of the phonograph with the near bar of the swing frame omitted.

Figure 3 is a vertical section on the line III—III of Figure 1, with certain background parts omitted.

Figure 4 is a horizontal section on the line IV—IV of Figure 2.

Figure 5 is a vertical section on the line V—V of Figure 1, with certain background parts omitted.

Figure 6 is a fragmentary perspective view of the framework of the machine.

Figures 7 to 13 inclusive, are detail views respectively of a series of rotary cams and parts operated by the cams.

Figure 14 represents detached perspective views of certain elements for effecting automatic adjustments of the tone arm and an edge view of one of said elements.

Figure 15 is an enlarged detail showing the construction of a clutch mechanism and certain other parts directly associated therewith.

Figure 16 is a detail perspective view of the shifter yoke for the clutch.

Figures 17 to 20 inclusive, are fragmentary views of the record magazine, to disclose certain elements for supporting the records when the magazine is in upright position and for automatic operation to drop the undermost record upon the turn table at the proper time.

Figures 21 and 22, are fragmentary vertical sections of the magazine with one of a series of catches to overlie the stack of records when the magazine is upright, Figure 21 showing the full complement of records in closely stacked relation as when the magazine is moving to or from its normal position, and Figure 22 showing the relation of the records as the undermost is about to be dropped upon the turn table.

Figure 23 is a detail perspective view of one of the oscillatory plates shown in Figures 17 to 20 inclusive.

Figure 24 is a vertical section on the dotted line XXIV of Figure 25, to show the locking bar holding the magazine against accidental turning movement on the swing frame.

Figure 25 is a section on the line XXV—XXV of Figure 24.

Figure 26 is a fragmentary detail perspective view of the slidable member of the clutch mechanism shown by Figure 15.

Figure 27 is a fragmentary elevation of the lift plate for raising a record off the turn table and fittting it into the magazine.

Figure 28 is an enlarged fragmentary plan view of the rock shaft and its bearing at one end, and the manually operable arm and spring stop arm and pendant stop arm, and also shows in dotted lines, the tone arm and an element movable therewith for engaging the spring stop arm or the other stop arm for the purpose of automatically operating the rock shaft.

Figure 29 is a vertical section on the line XXIX of Figure 28.

Figure 30 is a view showing the parts of the spring stop arm and pendent stop arm in detached relation.

Figure 31:
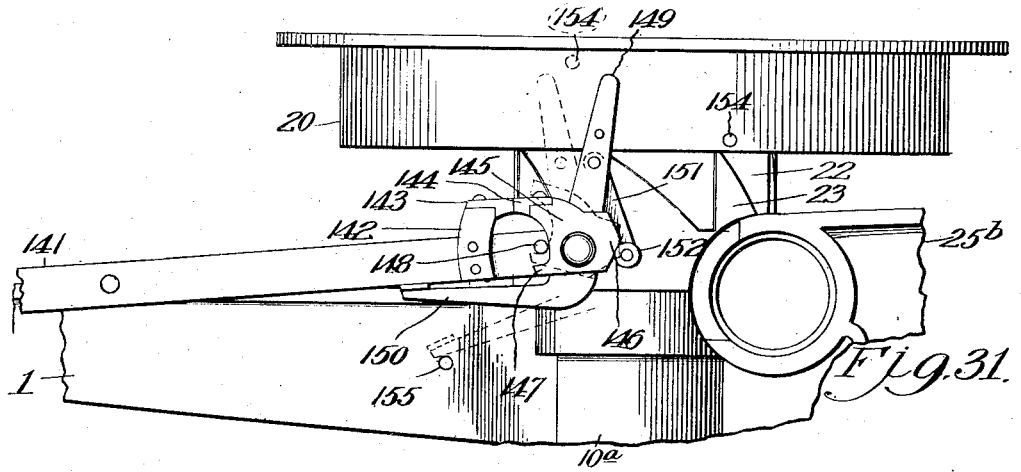

Figure 31 is a fragmentary detail enlarged view in the same direction as Figure 5, to show the lift-plate in elevation and an automatic switch for cooperative action with the lift-plate and a manually-operated lever for setting the switch in or out of operative relation to the liftplate.

Figure 32:
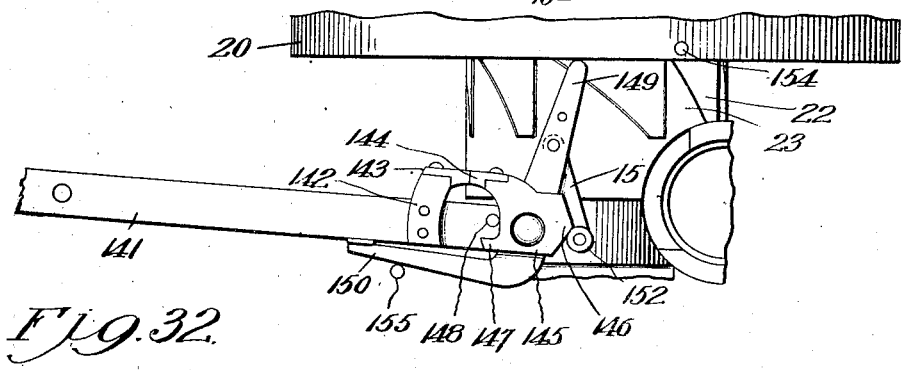

Figure 32 is a similar view with the lever in a different position of adjustment from that disclosed by Figure 31.

Figure 33:
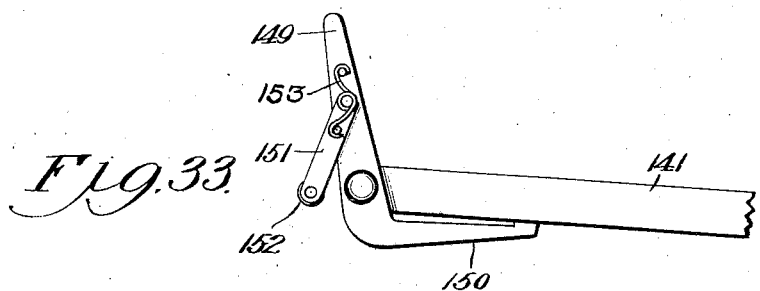

Figure 33 is a fragmentary view of the side of said switch opposite to the showing in Figure 31.

Before proceeding with a detailed description, it is desired to state that reference to directions, such as left hand or right hand, front or back, is made in all instances with respect to Figure 1, the upper and lower margins being read as the front and back faces respectively of the machine.

In the drawings, I indicates a suitable framework for securement in a cabinet, not shown, 2 is a vertical shaft operated in any conventional or preferred manner as by an electric motor 3, the preferred connections between the motor and shaft being hereinafter described, and the control switch indicated diagrammatically at S, Figure 1. A worm 4 on said shaft, within a housing part 4a of the framework, meshes with a worm wheel 5 within a housing portion 5a of the framework and mounted on a horizontal laterally-extending shaft 6 journaled in bearings 7 secured in fixed relation to the framework.

Near its right-hand end, shaft 6 is equipped with a worm 8 enmeshed with a worm-wheel 9, on a vertical shaft 10 within a cylindrical housing portion 10a of the framework. The lower end of said shaft (see Figure 5) is journaled in a bushing 11, retained in position by an underlying cap 12 threaded into the housing. The shaft above the wheel 9, is journaled in a similar bushing fitting in a flanged cup 12a threaded into the said cylindrical portion of the housing, and a packing 13 fits in the upper end of the upper bushing; the latter being channeled at 14 at its upper end for the convenient reception of lubricating oil which can pass over the upper end of the upper bushing to the packing and thence work downward around the shaft 10 to lubricate the same and the worm wheel 9 and the worm 8.

The upper end of shaft 10 has a central bore 15, and is provided with a circular turn table 16 carrying an attached friction sheet 16a. A spindle 17 slidably and rotatably fits said bore and forms the axle of a floating disk 18, to rest on and be turned by the friction sheet except during the period when a record 19 is to be disposed upon or lifted from the floating disk. At such time the floating disk rests upon the flanged rim of a cylindrical lift-plate 20, the latter having a depending cylindrical hub 21 journaled on the cylindrical portion 10a of the housing. The lower end of said hub has bevelled or ratchet teeth 22 engaging similar upwardly-projecting teeth 23 formed exteriorly on the said cylindrical housing portion of the frame, the arrangement being such that rotation imparted to the lift-plate in one direction, shall, through the cooperative cam action of the two sets of teeth, elevate the liftplate and cause its rim portion to engage and lift the floating disk off the turn table preliminary to the removal of a record and to the deposit of another record on the disk. A pair of angularly-disposed springs 24 connecting the lift-plate with the framework, resist the movement described, and when unopposed reverse the rotation of and lower the lift-plate to its original position so that the floating disk shall again rest upon the turn-table, it being noted that the friction plate affords a cushioned grip to permit the disk by slippage, to start slowly and progressively attain the full speed of the turn-table, thereby avoiding undesirable shock which would attend an instantaneous full-speed engagement. As thus far described, it will be apparent that when the motor is started, the turn-table begins to revolve, but that the floating disk turns with and at the same speed as the turn-table only when it rests thereon and is out of engagement with the, at that time, lowered lift-plate.

A rock-shaft 25 journaled in the framework and paralleling and spaced rearward from shaft 6, having its bearings in parts 25a and 25b of the framework, is equipped with a forwardly-projecting catch 26 for engagement with a notch in the underside of an arm of a lever 27, mounted on an arm 27a of the framework for swinging forwardly and rearwardly relative to shaft 6. A spring 28 (Figure 5) connects the lever and framework for urging the former forward when not latched, and an arm 29 projects from the lever for engagement by a part later described, which effects reverse or rearward movement of the lever to latching position.

The rock shaft 25 has an accessible handle 31, projecting up through the customary top (not shown) of the cabinet, and is adapted for manual rocking of the shaft, as will hereinafter appear, for tripping the lever to effect the premature operation of the mechanism for the automatic removal of a record from the floating disk without waiting to "play" or complete the playing of the record, and the handle has a pendent portion 32 of weight sufficient to rerock shaft 25 to cause its catch to automatically lock the lever 27 in its back or withdrawn position.

A clutch mechanism to transmit power from shaft 6 to a worm sleeve 33 journaled on shaft 6, and for control by a pivoted shifter or fork hereinafter described, is constructed as follows: 34 is a sleeve keyed to slide on shaft 6 and provided at its right-hand end with a deep ratchet tooth shaped spiral groove 35 extending about one-half way round, and merging into a circular shallow groove 36, both grooves being V-shaped in cross section, and the free end of lever 27 terminates in a segmental bevelled tooth 27b for engaging the deep end of spiral groove 35 and offering a resistance whereby, as the sleeve turns with the shaft 6, the former is forced to the left, the angle of the tooth corresponding to the inclined or undercut wall of the groove to guard against accidental disengagement. As the tooth enters the communicating groove 36, the sliding movement of the sleeve ends, but the tooth remains in the groove 36 until the sliding movement to the left mentioned, is continued through another instrumentality, as will hereinafter appear, and a still different instrumentality, hereinafter described, returns the lever to its initial or inoperative position to be automatically relatched in such position by the catch of the rock shaft 25.

The sleeve has a chamber 37 opening to the left and partially closed by a collar 38 threaded therein. An expansion spring 39 fits in the chamber and exerts force to the left upon a clutch sleeve 40 keyed to slide upon shaft 6. Said clutch sleeve fits rotatably in collar 38 and at its right-hand end has a threaded collar 41 receiving the thrust of said spring and fitting tightly against an internal shoulder 41a adjacent the end of collar 38. The clutch sleeve 40 is provided at its left-hand end with clutch teeth 42 for engagement under the left-hand movement imparted by the lever 27 to collar 34, with the opposing clutch teeth 12 on worm sleeve 33 to rotate said worm. In the event the two clutch faces abut but do not initially interlock, the spring 39 is compressed and as the rotation of the clutch sleeve 40 disposes its teeth opposite the spaces between the clutch teeth 43 of worm sleeve 33, the spring advances clutch sleeve 40 and its teeth interlock with said opposing clutch teeth 43 and impart turning movement to the sleeve 33. Worm sleeve 33 engages with an underlying worm wheel 44 upon the forward part of a shaft 45 journaled in the framework and extending at right angles to shaft 6 (see Figures 2 and 3) and mounted rigidly on said shaft 45 are cams 46, 47, 48, 49, 50, 51 and 52.

Under the rotation of shaft 45, all of the cams turn, but the cam 46 is the first to function. It is circular for the greater part of its area, having a notch 46a for receiving once in each revolution, a roller on an arm of upright shifter yoke 53, one wall of the notch being inclined so that it shall by pressure on said roller, rock the yoke. The shifter yoke is pivoted on framework bosses 53a of bars 53b, extending from housing member 5a to the lower part of housing member 10a (see Figure 6).

The upper end of the yoke fits astride a ring 54 on the collar 38, journaled on the clutch sleeve 40, and between an external flange on said collar and the left hand end of sleeve 34, and the ends of the yoke have the usual slots loosely fitting diametrically opposite pins 55 on the ring so that as the yoke is rocked by the cam 46, it forces the clutch 40, at the time partially engaged with teeth 43, into full engagement with said teeth, and incidentally withdraws sleeve 34 from engagement with lever 27. As this occurs, stem 56 of the yoke, in moving upward, contacts with the overlying arm 29 of lever 27 (see Figure 5), and forces said lever back to initial position and automatically relatches it upon the catch 26 of rock shaft 25, it being noted that the cam 46, maintains the yoke in its shifted position so that the driving action of the clutch mechanism applied to shaft 45, shall insure one complete revolution thereof before the clutch 40 is disengaged from the opposing clutch sleeve 33, which disengagement is effected through the force of a retractile spring 57 connecting an arm 58 of the shifter yoke with a fixed part of the framework, the yoke in such action pressing the sleeve 34 to the right until it has attained its initial position, and as this occurs the yoke arm 58 silently abuts a cushion stop 58a on a cross piece 59a of the framework bars 53b.

Shortly after the cam 46 starts to effect the full engagement of the clutches as explained, a lobe or nose 47a on cam 47 engages a roll on a cam lever 59 pivoted on the framework coaxially with the shifter yoke and adjacent the front tine thereof. This causes the lower end of said lever to swing to the left and pull with it a rod 60, pivotally attached at its right hand end to a depending arm 61 of a tubular rock-shaft 62 journaled on a tubular cross-bar 63, paralleling shaft 45, and mounted at its ends in a pair of bars 64 pivoted at 65 on the framework and constituting a swing frame, and one of said bars has an arm 66, connected by a retractile spring 67 to the framework to the left of the axis of said swing frame. The spring 67 exerts a lifting force on the swing frame when the latter is in normal position, as it connects with the swing frame at an intermediate point to the right of the fulcrum point 65. After the swing frame is moved upward by means hereinafter described, beyond a vertical position, the spring is wholly to the left of the vertical plane of the fulcrum point of the swing frame (see dotted lines Figure 2) and hence is exerting a pull in the reverse direction and is ready to start the swing frame and magazine on the return to normal position, the spring exerting reversed application of force until the swing frame has passed a vertical position and by the force of gravity continues its movement to the right, the spring then offering resistance to such movement and serving as a counter-balance for the magazine in its downward movement.

A ring-shaped magazine 68 fits between the outer or free ends of the swing bars 64 and at diametrically opposite points—at front and rear sides, is pivotally mounted on bolts 69 and 69a, secured to the front and rear bars 64 respectively. At the front side of the magazine it has a circular external boss 70 provided with pair of diametrically-opposite peripheral notches 71, one of which is engaged by one end of a locking bar or catch 72, provided with a pin 73 engaging a guide slot 73a in the adjacent bar 64. The other end of the locking bar is pivoted to an arm 74 of rock-shaft 62, and a spring 74a attached to arm 74 and adjacent bar 64 holds the locking bar 72 yieldingly advanced. The bar 72 locks the magazine from rotation as it is carried by the swing frame to or from a position over the turn table. The operation of the locking bar through the action of lever 59, disengages the bar from the collar 70, and as this tripping action occurs, the rotating cam 48, through engagement of its notch 48a with a roller on one end of a lever 75 pivoted at 75a on the framework rocks said lever to cause its opposite or left-hand end to move upward and apply pressure on a vertical rod 76 mounted slidingly in an oscillatory tubular tone arm support 77, journaled in a vertical sleeve 77a secured centrally within a part of the framework. As the rod 76 is thus moved upward, it forces an overlying lever 78 pivoted to the tone arm support, in the same direction, to tension a flat spring 79 and as an extension 80 of the said lever engages the spring, the latter, which applied upward pressure while being tensioned, on the tone arm 81, increases such pressure and tilts the tone arm to elevate its needle 82 to a plane above that of a record on the turn table, this action occurring after the playing of the record ends, it being noted that the tone arm is of substantially inverted L-shape and that its base portion is vertical and pivoted at 83 to the opposite lugs 83a of the tone arm support adapted for horizontal oscillatory movement. The cam 48, through the mechanism described, maintains the tone arm tilted as explained, until after the latter is swung, as hereinafter described, to the starting point for the playing of the next record deposited on the floating disk.

Located in different horizontal planes are three horizontally movable plates. One of the plates is rigid with the tone arm support, which is located within a vertical segmental housing section 84 of and at the rear left-hand corner of the framework, and within a collar 85 forming an extension of the housing. Said plate 86, has a ratchet toothed peripheral edge 87 for rocking the shaft 25, as hereinafter explained, and depending pin 88. The next plate 89 below, is journaled on the sleeve 77a and has an arm 90 to press against pin 88 to rock the plate 86 and hence turn the tone arm support 77 to swing the tone arm to the left. The third plate 91, underlies plate 89, and is journaled on the sleeve 77a. It has an arm 92 upon which pin 88 presses in due course, to force plate 91 to swing to the left against the resistance of a retractile spring 93, connecting the plate with the framework for the purpose of swinging the plate 91 with plate 86 and the tone arm to the right to their starting positions, and to limit this latter movement, a stop screw 94 is threaded on a bend 94a of the plate 91, for impingement on the framework, and a screw 94b is utilized to clamp the bent end of the plate to hold the stop screw against accidental adjustment.

About the time the tone arm is tilted to raise the needle, the incline 49a on cam 49 has come in contact with roller 95 of lever 96 on the framework, and said lever is swung to the left. At its free or upper end of the lever carries a pivoted sleeve or knuckle 97 slidingly fitting a turned portion of a rod 98 pivoted to swing plate 89, and applying pressure, under the lever movement, through a spring 99, to force the plates 89 and 86 to swing to the left. As spring 93 is stronger than spring 99, the latter is compressed by the pressure of the knuckle 97, and then the full pressure of the knuckle causes the spring 93 to yield so that the lever 96 may make its full stroke to the left and then be ready, under the retraction of spring 93, to reverse such movement when the roller 95 goes down the declining surface 49b of cam 49.

During the time that the tone arm is being swung to the left (or back) from the record, and just after locking bar 72 has been tripped, the first lobe 100 of cam 50 engages a roller on lever 101 pivoted on the framework, and swings the lever upward. The free end of the lever has a pivoted knuckle 102 secured upon a link 103 pivotally attached to a bell-crank lever 104 mounted on the framework. A rod 105 forms a connection between the other arm of the bell-crank and a flat spring-metal belt 106 extending around and secured to a ratchet collar 107 journaled on boss 69b of the magazine. The other end of the belt is connected by a retractile spring 108 to the adjacent arm or side 64 of the swing frame. The box 69b of the magazine has a recess containing a pivoted dog 108a, and a spring 109 tending to protrude the dog out of the recess, and into one of a pair of internal notches 110 of the ratchet collar. It will, therefore, be apparent that the cam actuated lever 101 through the connections traced, causes the collar to apply force upon the dog carried by boss 69b and hence impart rotary movement to the magazine to the extent of a half revolution.

The means for turning the magazine on the swing frame to face in the desired position, having been explained, reference will now be made to the features which function actively in the support, ejection and recovery of the records. The magazine is bossed outwardly at three points at 68a to provide internal vertical recesses 68b wherein are secured bevel-headed spring-catches 68c adapted to be sprung outward by a stack of records, as the latter are initially loaded by hand into the magazine, and then react so that the heads of the catches shall overlie the records when the magazine is in an upright position (see Figures 1, 21 and 22), and underlie and support the records when the magazine is inverted. To underlie the stack of records when the magazine is in an upright position and overlie them when the magazine is inverted, there is a series of segment-shaped swing plates 68d pivoted to the magazine and adapted for swinging movement in a plane paralleling the playing faces of the records, the said plates fitting within slots 68e in the wall of the magazine (see Figures 17 and 19). A corresponding series of oppositely-projecting similarly arranged segment-shaped plates 68f are disposed in a different horizontal plane from, but are pivoted coincidentally with, the plates 68d respectively, and fit in slots 68f' of the magazine, and except at periods when being adjusted, as hereinafter appears, projecting outwardly from the magazine when the plates 68d project inwardly thereof. To insure these relative positions of the two sets of plates, a narrow ring 68g fits slidingly around the magazine and is provided with slots 68h and 68i receiving the said plates 68d and 68f respectively. The ring is adapted for rotatable movement on the magazine in one direction through the pull of a series of springs 68j connecting it to the magazine, the movement imparted by said springs causing the inner end walls of the respective slots 68h to swing plates 68d to their inner or proper position for supporting the entire stack of records, and the plates 68f in the reverse direction. This is the initial or normal position of the ring and the swing plates 68d and 68f and, regardless of whether the magazine is in upright or inverted position, said plates occupy the positions mentioned except at the short periods when the magazine is in upright position and at the same time above and axially alined with the center of the floating disk for the purpose of dropping a record upon the latter. In other words, the plates 68f protrude into the magazine and serve as a support for stacked records therein only when the bottom record of the stack is about to be deposited on the floating disk. At such time the magazine is upright over the floating disk as hereinafter explained and the ring movement has been reversed, the reverse movement causing the inner end walls of slots 68i, to apply pressure on plate 68f to swing them inward and the connected plates 68d outward, the former taking positions under the second record from the bottom of the stack and the plates 68d moving out of the path of the bottom record to permit it to drop upright on the floating disk, which at this time has been raised and is in close proximity to the bottom record.

The magazine ring has an arm 118 which extends downward when the magazine is in the position described, to be subjected to lateral pressure by an arm 118a of the lift-plate, this pressure turning the ring on the magazine to cause the swing plates to operate as and for the purpose described. To apply such pressure at the proper moment, cam 52 operates lever 122, and the latter is pivotally connected by a link 123 to an arm 124 of the lift-plate, so that the latter is turned against the resistance of spring 24, and the ring is turned against the resistance of spring 68j, it being noted that the lift-plate is caused to also move upward by reason of the cooperating framework teeth 23 and lift-plate teeth 22 to dispose the floating disk in proximity to the record to be dropped thereon.

Upon the first operation of cam-actuated lever 101, following the playing of a record, the magazine is turned a half revolution on pivot bolts 69—69a, from upright or normal to inverted position, so that the plates 68d overlie and the spring catches 68c underlie the stack of records in the magazine, and upon the first swing of the magazine over the floating disk, the arm 118 is functionless because it is, at such time, projecting upwardly, and out of the path of operation of lift-plate arm 118a. The next action following the swinging of the tone arm from over the record and the positioning of the inverted magazine over the played record on the floating disk, is the upward movement of the lift-plate 20, and in this action, the said record upon the floating disk, is forced by the latter upwardly into the inverted magazine and presses the, at such time, depending catches 68c apart and concurrently lifts the stack of records, the catches snapping under the record thus forced upward into the magazine to carry the load on the entire stack. Immediately after the record has been placed in the inverted magazine as explained, the lift-plate descends and then the swing frame is swung back to normal position, and just before it reaches such position the locking bar is tripped, and as it reaches its normal position, the magazine is turned a half revolution to upright position. This disposes the record picked-up by the magazine at the top of the stack, it being noted however, that said record is inverted in the magazine, that is, the side which was undermost and hence unplayed when the record was on the floating disk, is now uppermost so that when next placed upon the floating disk, its originally unplayed side will be disposed for engagement by the tone arm needle. (By reference to Figures 17 to 22, the operation of the swing plates and the results accomplished thereby will be understood. Figure 21 indicates the position of the records when the magazine is upright, and all of the records are resting on the swing plates 68d, when positioned as shown in Figures 17 and 18, Figure 22 showing the position of the records as the bottom one is being released to drop upon the floating disk, and the load of all of the others is being assumed by swing plates 68f, which at such time have attained the position disclosed by Figures 19 and 20.)

By the time the magazine is restored to normal or upright position, cam 50 has turned sufficiently to permit spring 108 to retract and restore parts 106, 107, 104 and lever 109 to normal position, the collar 107 turning on boss 69b without turning the latter and the magazine, because in such reverse rotation, the collar forces and holds the dog 108a, inward until the other notch 110 registers with the dog to permit it to be snapped outward into the said notch, as a preliminary setting for the next half revolution of the magazine on its pivots.

To effect swinging movement of the swing frame to dispose the magazine over the floating disk at the proper times, cam 51 applies pressure on roller 112 of lever 113, and the lever exerts a pull to the left on the swing frame through the still coil spring 114 attached at its opposite ends to said lever and a lug 115 of cross-bar 63. This swing movement is regulated and controlled by bracing means consisting of a rod 116 pivoted to lever 113 and provided with a diametrically reduced extension 116a, extending slidingly through a knuckle 117 pivotally mounted on a crank-arm 117a, of cross-bar 63, the shoulder 116b formed on rod 116 and bearing normally against knuckle 117, limiting sliding movement of the rod in one direction to arrest the magazine when it has attained its normal position, as shown in Figure 1. The first lifting movement described as imparted to the swing frame and magazine by spring 114, disposes the magazine in horizontal position vertically above the floating disk as hereinbefore stated, with the trip arm 118 projecting upwardly. In this connection it will be noted by reference to the dotted line position Figure 2, that the swing-frame will always be positively arrested as the axis of the magazine is vertically alined with that of the floating disk, by contact of the arms or side bars of the swing frame with the upper right-hand side 25b of the framework. Because of this positive stoppage it is necessary to accommodate further movement of the lever 113 under the pressure of cam 51, by providing for upward slippage of brace rod 116 (through knuckle 117), relative to the arm 117a of the swing-frame cross rod 63. This automatic adjustment compensates for wear or slight inaccuracy of assemblage of parts.

The magazine being inverted, the beveled spring catches 68c form an underlying support for the stacked records within the magazine as hereinbefore explained, and at this time the cam 52 engages roller 121 on a cam lever 122 on the frame, and swings the latter to the left so that, through a link 123 connected to a lug 124 of the lift plate, the latter is rotated and at the same time, through the engagement of the cooperating beveled teeth 21 and 23, moves upward until it engages and lifts the floating disk off the turn table, the disk ceasing to rotate as this action occurs. The disk with the superposed record, is lifted high enough, as hereinbefore explained, for the record to force the catches outward until said record is in a plane above the horizontal shoulders of the catch teeth to permit the latter to snap inward below the record.

The continued rotation of the cam 52 then releases the roller 121 to move toward the axis of the cam and the spring 24, stretched by the simultaneous rotation and elevation of the lift-plate react to pull lever 122 to the right and reverse such rotation and effect the lowering of the lift-plate and the redeposit of the floating disk upon the rotating turn-table. As this result is accomplished, the roller 112 of lever 113 has reached the decline 51a of cam 51, and the stretched balance spring 67, at this time to the left or past center with respect to a plane intersecting the pivotal points of the swing frame with the framework and magazine, reacts through the thrust rod 116 on the knuckle 117, to swing the swing frame to the right far enough to utilize its weight and that of the loaded magazine in effecting the return of the swing frame and magazine to original position as fast as permitted by the cam 51. During the descent of the magazine, the second lobe of cam 47 has attained a position when it would engage the roller of lever 59, but as the swing frame in its ascent caused link 60 to crowd lever 59 back to the left, the roller is lifted clear of the cam so that said second lobe does not engage the roller of lever 59 until the swing frame has almost completed its return to normal position, and at that time the engagement mentioned takes place. This holds the lever 59 practically stationary so that the continued downward swing of the swing frame, effects a turning movement of shaft 62, and thereby effects the unlocking of the magazine by the withdrawal of the locking bar 72. By this time the second lobe of cam 50 is engaged with the roller of lever 101, and the magazine is rotated a half turn to its original or upright position, and it is locked in such position by bar 72, as hereinbefore explained.

To cause the tone arm to set in motion forces to invert and bring the magazine over and remove the record from the floating disk and then return the magazine to normal position and redispose it over and effect the deposit of a new record upon the disk, the following mechanism is provided: A resilient spring stop 123 is secured to and projects upward at the left-hand end of rock shaft 25, and an angle arm stop 124 is adjustably suspended from the shaft adjacent the spring arm. The spring stop stands in such position that it functions as hereinafter explained in conjunction with the use of Victor records provided with an eccentric groove 125 (see Figure 1) to release lever 27 for engagement with slidable sleeve 34. The angle arm stop 124 at such time is functionless, but when a record is being played in which the playing groove ends in a spiral groove 125a (see Figure 1), or has any other uniform method of ending, which compels the needle to move inward far enough, the angle arm stop is forced backward by the depending pin 88 of the swing plate 86 as the latter swings rearward under the extended inward or right-hand movement of the tone arm effected by the travel of the needle in the spiral groove. The angle stop transmits force through rock shaft 25 to release the lever 27 to permit the latter to engage the sleeve 34. It may thus be seen that if the magazine contains records of both the eccentric ending groove type and/or the spiral or equivalent groove type, the playing proceeds, it being understood, however, that the stop arm 124 is adjustable rotatably on shaft 25 so that it may be preliminarily set to insure enough rotation of shaft 25 to effect the release of lever 27. For example, if the record is a short one and ends before the needle travels inward as far, the stop arm should be set further forward so that the pin 88 of plate 86 which obviously will move rearwardly a shorter distance than if the record is a long one, will earlier engage it to insure the release of lever 27 by the time the rearward movement of the plate 86 ends. It is possible, of course, to provide short records with a long enough spiral groove to insure operation of the stop arm without necessitating the adjustment mentioned.

The spring stop, as shown most clearly by Figures 28, 29 and 30, is fastened between collars 126 rigid on shaft 25, and has a rearwardly-projecting ear 127, and the angle arm stop has a hub 128 pivotally mounted on shaft 25, and an ear 129 projecting rearwardly from the hub 128 and overlying and spaced from ear 127. A screw bolt 130 extends through ear 127 and is threaded in ear 129, and a coil spring 131 fits around the bolt and bears at its opposite ends against the said ears. When it is desired to adjust the angle arm stop to accommodate a record having a spiral groove ending, or any uniform ending groove, the screw bolt 130 is operated to turn the angle arm stop to the desired degree. The spring 131 is slightly compressed if the adjustment sets the lower end of said stop further forward, and relaxed if the opposite adjustment is desired. The spring will always maintain pressure on the two ears 127 and 129, so that the two stops shall be held in proper relation and there can be no free pivotal movement of the angle stop which would result in such play or vibration of the screw bolt in ear 129 as to produce a clicking or other undesirable sound. If it is desired to effect the tripping action of the shaft prematurely before the playing of the record on the floating disk is completed, the handle 31 is swung forward by hand, the depending weight 32 insuring the restoration of shaft 25 to normal position.

Referring now to the motor, it will be noticed that it is connected directly to the drive shaft 4, and that it has a connection with the framework providing a torsion support, especially desirable where alternating current is used. A disk 132 is rigid with the framework and concentric to the vertical shaft 4, and said disk has a plurality of depending ears 133, carrying vertically pendent flat springs 134 standing radially of the axis of the disk. The lower ends of said springs are attached to ears 135 rigid with and extending upward from the motor case, the arrangement being such that the motor may have a slight oscillatory motion around its axis, but no bodily lateral movement, the oscillatory action providing for the absorption of the pulsations of the motor, if of the alternating type, so that the gearing elements shall not be subjected to jarring movement while the phonograph is in operation. The pulsations are completely absorbed by the springs. The shaft of the motor carries a flanged collar 136 and the lower end of the worm shaft 4, has a similar collar 137 spaced above collar 136, and each of said collars has a plurality of spaced pins 138 and 139 respectively, which project toward the other collar but terminate short thereof. A belt 140 exteriorly engages pins 139 and interiorly engages pins 138, and transmits power from pins 139 rotatable with the motor shaft to the pins 138 fixed with relation to the worm shaft. The belt operates as a direct drive connection, efficiently, without noise or slippage, and accommodates the oscillatory movement of the motor, and as a result the phonograph is operated silently at a constant and proper speed without the use of a governor.

When the phonograph is not to be used for an appreciable period of time, especially where located in a hot room or otherwise subjected to heat, it is desirable to arrest the operation at the moment when the floating disk has moved upward to lift a played record into the magazine and is supporting the entire stack, as the contact of the bottom record for almost its full area, with the support,—the floating disk,—protects said record and those above the same from warpage in the presence of heat sufficient to cause warpage when the stack of records is not vertical or, if vertical, is supported only by the swing plates or the catches of the magazine. The operation of the phonograph can be stopped of course by manual operation of the switch S, when the parts are in the desired relation, but to do this, the lid of the cabinet must be raised so that the operator can, by visual inspection, determine the right moment to throw the switch. To avoid the necessity of watching the operation and determining the exact time for breaking the current to accomplish the result mentioned, I have provided an electrical switch and manually-operable means whereby said switch can be set at any time during the playing of a record, in such position that it will automatically operate to break the circuit at the moment mentioned. The manually operable means for the switch will be conveniently accessible exteriorly of the cabinet, and will preferably be always employed in starting and stopping the operation of the phonograph, leaving the switch S for emergency use only.

As shown in Figures 31, 32 and 33, the operation-control switch is caused to break the circuit by the lift-plate as the latter attains its highest position in lifting and placing a record in the inverted overlying magazine, and when the use of the phonograph is to be resumed, the operator will simply reverse the operation of the manually-operable means to withdraw said switch to a position out of the sphere of action by the lift plate and incidentally effect the closing of the circuit and resumption of operation of the phonograph.

As the preferred form and location of the automatic switch could not be intelligently and fully depicted in Figures 1 or 2, and would not appear in the other main Figures 3 to 5 inclusive, reference is to be had to Figures 31 to 33 inclusive, for a proper understanding of the location, construction, and operation of the automatic switch and the manually-operable means for setting the switch in or out of operating position relative to the lift-plate.

A lever 141 is suitably pivoted on a fixed part of the framework so as to require reasonable force to operate it, and projects through the front wall (not shown) of the cabinet for convenience of accessibility and operation. It carries an insulation block 142 equipped with a contact plate 143 normally in electrical engagement with a second contact plate 144 carried by and insulated from a rock plate 145 on the rear end of the lever, the rock plate having a V-shaped double-edged cam portion 146 and a lug 147, the latter when the rock plate is operated to break the circuit through the switch, as hereinafter explained, serving to limit such rocking movement by abutment against a stop-pin 148 on the lever. A bell-crank lever is pivoted on the lever 141 coincidentally with the rock-plate, one arm 149 of the bell-crank lever projecting upward and the other arm 150 projecting outward and partly underlying the lever 141, and pivoted on arm 149 is a swing arm 151 provided with a roller 152. A tensioned coil spring 153 is mounted on the pivot of the swing arm and one end bears against the bell-crank lever and the other end upon the swing arm and tends to cause roller 152 by engagement with the lower angle edge of the cam portion, to hold the rock plate with its contact 144 pressed against contact 143. Both contacts are conventionally wired relative the switch S and the motor, so that the circuit is broken and the operation of the phonograph arrested when the circuit is opened through either switch. See Figure 31 for a diagrammatic representation of the wiring referred to.

When the outer or handle end of lever 141 is in elevated or normal position, its opposite or rear end is depressed to such extent that the upper end of arm 149 of the bell-crank lever is below the horizontal plane of an outwardly-projecting lug of lift-plate 20, it being noted that at such time the forwardly-projecting arm 150 of the bell-crank lever is held by an underlying fixed part 155 of the framework against the lever 141, which lever therefore positively limits the operation of the bell-crank lever in one direction, and it will also be noted that the roller 152 is pressing forwardly on the lower angle edge of cam portion 146 of the rock plate to hold the latter with its contact 144 against contact 143, and that consequently, the circuit is complete and the phonograph is in normal or regular operation.

If, while a record is being played, it is desired to arrest the operation of the phonograph after the playing of such record is finished, the outer end of the lever 141 is depressed. This lifts the bell-crank lever until it attains the full-line position (Figure 31) in the path of forward and upward movement of lug 154 as the lift plate turns and moves upward in removing the disk-carrying record off the turn-table, it being preferred that the lug shall not engage the bellcrank lever until the lift-plate movement is nearly completed. In the movement of the bell-crank, as explained, by the said lug, the roller 152 rides upward on the lower angle edge of the cam portion of the rock-plate 145, and passes over the crest of the cam at the instant the lug clears the top arm 149 of the bell-crank and the load of records is assumed by the floating disk, and the transfer of pressure by the roller, thus secured, to the upper angle edge of the cam portion 146, slightly extends the described movement of the bell-crank and instantly rocks the rock-plate to withdraw contact 144 from contact 143 with a snap, to prevent arcing and effect instant stoppage of operation of the motor.

To restart operation, the lever 141 is operated to relower its rear end. In this movement the front end of arm 150 of the bell-crank lever, encounters the fixed stop 155, and the bell-crank lever is rerocked to its original position until arrested by the descending rear portion of lever 141, and in this rerocking operation, the roller 152 rides downward over the crest of the cam portion of the rock plate and then applies pressure upon the lower angle edge of the cam portion thereof and rocks the said plate to again complete the circuit, the lever 141 being left in the position described with the switch functioning to complete the circuit but in inoperative or withdrawn position relative to the lift plate lug.

Operation

Assuming that the parts are disposed as in full lines, Figures 1 and 2, the switch is operated for the starting of the motor to effect rotation of the record on the floating disk and the tone arm will swing inward under the pull of the needle engaging the record. As the "playing" of the record ends, the movement imparted to the needle by the eccentric groove 125 or spiral groove 125a, will effect unlatching rocking action of shaft 25, and as this occurs the spring 28 causes lever 27 to engage rotating sleeve 34 and force it to the left until clutch member 40 is partially engaged with the clutch teeth of and imparts turning movement to worm sleeve 33 and hence to shaft 45 and the series of cams thereon, which cams, at such time, are relatively positioned with respect to the associated levers, as indicated best by Figures 7 to 13 inclusive. As the shaft 45 starts, the roller 56a rides out of notch 46a and the shifter yoke 53 extends the movement to the left of the slidable sleeve and clutch member to effect full engagement between said clutch teeth and incidentally disengage the spiral groove of sleeve 34 from lever 27 and force the latter back to its initial position where it is relatched by the rock shaft. As the above operations occur, the free or upper end of lever 59, is forced to the right by the cam lobe 47a, this operation of the lever, through rod 60 and crank-arm 61 of tubular shaft 62, withdrawing locking bar 72 from engagement with a notch 71 of collar 70 rotatable with the magazine. About concurrently with the unlocking of the magazine, the cam 48 operates lever 75 to cause rod 76 to tilt the tone arm and thereby raise the needle from the record, and immediately this is effected, the cam 49 swings lever 95 to the left, so that, through bar 98 and plate 89, plate 86 shall be swung to the left and cause the tone-arm support 77 to turn and swing the tone arm in the same direction, it being noted that before this movement ends, pin 88 applies pressure on lug 92 of plate 91, to compel the latter to swing to the left against the resistance of its spring 93, beyond the position indicated by Figure 4, the movement of all of said plates and the tone arm ending when the latter has attained the position approximately indicated by dotted lines in Figure 1.

About concurrently with the swing of the tone arm to the left well beyond the margin of the record, the lobe 100 of cam 50, by pressure on the lever 101, swings the latter upward, and through link 103, bell-crank 104, and belt 106, turns the ratchet collar 107 a half revolution, the ratchet collar incidentally causing similar movement by pressure on pawl 108a of boss 69b and hence of the magazine until the latter is inverted relative to the normal or initial position in which it appears in Figures 1 and 2, and just before this turning movement of the magazine ends, the cam 47 has turned far enough to allow spring 74a to readvance the locking bar 72, so that the latter shall snap into the registering peripheral notch 71 of collar 70 and thus arrest and hold the magazine rigidly in its new or inverted position, and at the same time the lobe 100 releases lever 101 and permits spring 108 to retract and return the parts which turned the magazine, to initial position, but with the pawl 108a engaging the other notch 110 of the collar 107.

Immediately after the magazine is locked in inverted position as explained, cam 41 starts to swing lever 113 to the left, and through spring 114 starts the swing frame on its swing in the same direction, this action continuing until the swing frame abuts the upper right-hand side of the framework, at which time the swing frame and magazine are positioned as indicated by dotted lines, Figure 2, and retain such position during the travel of the roller 112 of lever 113 to the outermost point of the lobe 51a of cam 51, it being noted that the upward swing of lever 101 may continue for a short distance after the swing frame movement ends, as the spring 114 will stretch and the brace 116 slide to accommodate such further movement between the lever, this differential movement between the lever and swing frame compensating for wear, slacking of the spring 114 or other irregularity due to inaccurate setting of parts. Immediately after the magazine is positioned as explained and while held stationary, the lobe 52a of cam 52 engages and swings lever 122 to the left and thereby effects turning and raising of the lift plate and floating disk, the lifting action being sufficient to force the record carried by the disk, up into the magazine while it passes and is supported upon the spring catches 68c. As the said lobe 52a passes the roller 121 of lever 122, the springs 24 tensioned by the turning movement of the lift plate, react and reverse the rotation of and relower the lift plate until the floating disk is again resting on the revolving turn table. By this time roller 112 starts descending on the lobe 51a of cam 51, to permit the swing frame and magazine to be returned or relowered to normal position, as hereinbefore explained, through the pull of spring 67 and the force of gravity. As this result is attained, the lobe 47b of cam 47, is underlying and engaging the roller of lever 59 and has therefore effected the withdrawal of the locking bar 72 from the engaged notch of collar 70, and immediately thereafter cam 50 has turned far enough for lobe 100a to start the operation of lever 101 to cause the spring-belt and ratchet mechanism to effect a second half revolution of the magazine so that it shall be returned to its initial or upright position, and as this occurs, lobe 47b, has passed out of engagement with the roller on lever 59, to permit the magazine to be locked in upright position. Immediately after the magazine is secured as explained, the second lobe 51b of cam 51 swings lever 113 to the left to operate the swing frame to again dispose the upright magazine above the floating disk. As this operation is effected, and while roller 112 is upon the periphery of lobe 51b of cam 51, like lobe 52b of cam 52, swings lever 122 to the left, and, as hereinbefore explained, effects the turning and raising of the lift plate until the floating disk is within close proximity to the bottom of the magazine. During this upward and turning movement of the lift plate, the projecting arm 118a of the lift plate engages the depending arm 118 of magazine ring 68g, and turns the ring to effect the release of the undermost record, so that said record shall drop upon the floating disk and the remaining records be retained in the magazine, all as hereinbefore explained. As the lobe 52b clears the roller 121, the spring 24 effects the return of the lift plate to normal or lowered position and the deposit of the floating disk upon the revolving turn table, and as this occurs the arm 118 being released by lift plate arm 118a, springs 68j return the ring and hence the swing plates 68d and 68f, to normal position. Immediately after the lift plate is returned to normal position, the cam 51 has turned far enough for roller 112 to start its descent on lobe 51b to permit lever 113, to again swing to the right under the pull of spring 67 until the swing frame passes beyond a vertical position and continues its return to normal position under gravitative force As the swing frame is swinging to the right, roller 95 is moving to the right on decline 49b of cam 49, and permits tensioned spring 93 to swing the tone arm to the right until adjustable stop 94 engages the framework and arrests the tone arm with its needle overlying and spaced from the outer portion of the revolving record.

As soon as the tone arm attains the position mentioned, the notch 48a of cam 48 permits the lever 75, preferably heaviest at its left hand end, to operate and withdraw from engagement with the rod 76, to permit the tone arm to tilt downward and apply the needle 82 to the record. As this occurs the revolution of shaft 45 is about completed, and the notch 46a of cam 46, is opposite the roller on the shifter yoke 53 to permit the spring 57 to operate the yoke and effect the declutching of sleeve 33 and member 40, and the return of the latter and sleeve 34, to original position. It will thus be seen that the record is played without interruption, as until the playing is completed or the rock shaft is prematurely tripped by hand to effect the early removal of the record, the shaft 45 is at rest, and said shaft makes one complete revolution between the playing of one record and its replacement by another, and being stationary during each playing operation. It will thus be apparent that all of the records will be played on one side and then on the other side, and that these operations will be repeated indefinitely if the operation of the motor is not stopped. From the above it will be apparent that I have produced an automatic phonograph possessing the features of advantage set forth as desirable in the statement of the objects of the invention, and while the preferred embodiment, in principle, is illustrated and described, it will be understood that I reserve the right to make modifications as regards its details within the principle of construction and mode of operation disclosed.

I claim:

1. In an automatic phonograph, a record-carrying magazine, a shaft, a rotary floating disk centrally fitted and slidable vertically on said shaft and forming an underlying support at times for and axially alined with each record for nearly the full area thereof, means for imparting relative approaching movement to the magazine and disk sufficient for the record to enter the magazine without affecting its axial alinement with the disk, and means for arresting the operation of the phonograph while the disk is serving as a support for the said record introduced within the magazine by the floating disk when the latter is within the magazine.

2. In an automatic phonograph having a driven turn-table and a disk upon and driven thereby and underlying and rotating each record, means for breaking the driving relation between the turn-table and disk to arrest rotation of the latter and the record, a magazine, and means for swinging the magazine and effecting relative approaching movement between it and the disk sufficient for the record to be fitted into the magazine while supported by the disk.

3. In an automatic phonograph having a driven turn-table and a disk driven thereby and underlying and rotating each record, means for breaking the driving relation between the turn-table and disk to arrest rotation of the latter and the record, a magazine, means for imparting relative approaching movement of the magazine and disk sufficient for the record to be fitted into the magazine while supported by the disk, and means for arresting the operation of the phonograph while the disk is supporting the record in the magazine.

4. In an automatic phonograph, a magazine containing a vertical stack of records, and means projecting under the undermost record of the stack as a support therefor, a turn-table, a floating disk of smaller diameter than and underlying and forming a flat support for a record, before, during and after the playing thereof, and during the playing of the record, resting on and driven by the turn-table, and means for effecting relative approaching movement between the magazine and disk, sufficient to disengage the latter from the turn-table and cause the record on the disk, to enter the magazine from below to a sufficient degree to force the said projecting means out of stack-supporting position and lift and support the stack.

5. In an automatic phonograph, a magazine containing a vertical stack of records in superposed relation, a series of spring-catches projecting under the undermost record of the stack as a support therefor, a floating disk of smaller diameter than and underlying and forming a flat support for a record, before, during and after the playing thereof, the axis of the floating disk and the record thereon being in vertical alinement with the axes of the magazine and stack of records therein, means for effecting relative approaching movement between the magazine and disk sufficient for the record on the disk, to enter the magazine from below to a sufficient degree to force the said projecting means out of stack-supporting position and lift and support the stack, and means to automatically arrest the operation of the phonograph as the record lifted by the disk attains a height sufficient for it to assume the load of the superposed records of the stack.

6. In an automatic phonograph, a magazine for holding a stack of superposed records, a floating disk carrying a record, means to swing and thereby dispose the magazine horizontally above the floating disk, and rotary means to lift the disk until the record thereon is in flat contact with the bottom-most record of the stack within the magazine.

7. In an automatic phonograph, a magazine for holding a stack of superposed records, a floating disk carrying a record, means to swing and thereby dispose the magazine horizontally above the floating disk, rotary means to lift the disk until the record thereon is in flat contact with the bottom-most record of the stack within the magazine, and means on the magazine for underlying the record on the disk while the latter occupies its elevated position.

8. In an automatic phonograph, a magazine for holding a stack of superposed records, a floating disk carrying a record, means to swing the magazine to a position horizontally above the floating disk, rotary means to lift the disk until the record thereon is flatly in contact with the bottom-most record of the stack within the magazine, means for stopping the operation of the phonograph to retain the floating disk in its elevated position and the magazine above the same, and means within the magazine underlying the disk record supported by the floating disk.

9. In an automatic phonograph, driving means, a turn-table driven thereby, a floating disk for underlying and forming a support for a record and normally resting on and rotating with the turn-table, a magazine containing a stack of records, means actuated by the driving means to dispose the magazine horizontally above the floating disk, and means also actuated by the driving means for lifting the floating disk off the turn-table and high enough to dispose the record thereon in flat contact with the underside of the bottom record of the stack within the magazine.

10. In an automatic phonograph, driving means, a turn-table driven thereby, a floating disk for underlying and forming a support for a record and normally resting on and rotating with the turn-table, a magazine containing a stack of records, means actuated by the driving means to dispose the magazine horizontally above the floating disk, means also actuated by the driving means for lifting the floating disk off the turn-table and high enough to dispose the record thereon in flat contact with the underside of the bottom record of the stack within the magazine, and means to arrest the operation of the driving means while the floating disk is holding the record against the bottom record of the stack.

11. In an automatic phonograph, driving means, a turn-table driven thereby, a floating disk for underlying and forming a support for a record and normally resting on and rotating with the turn-table, a magazine containing a stack of records, means actuated by the driving means to dispose the magazine horizontally above the floating disk, means also actuated by the driving means for lifting the floating disk off the turn-table and high enough to dispose the record thereon in flat contact with the underside of the bottom record of the stack within the magazine, and means operated by the lifting means to arrest the operation of the driving means while the floating disk is holding the record against the bottom record of the stack.

12. In an automatic phonograph, a driving shaft, a turn-table driven by the shaft, a floating disk for underlying and forming a support for a record and normally resting on and turning with the turn-table, a magazine for holding a stack of records, means actuated by the shaft to dispose the magazine horizontally above the floating disk, a lift plate, means actuated by the shaft to turn the lift plate, means to cause the lift plate as it turns, to lift the disk off the turn-table and high enough to dispose the record thereon within the magazine and in flat contact with the bottom record of the stack, and means actuated by the movement of the lifting means to arrest the operation of the driving shaft while the floating disk is holding the record thereon against the bottom of the stack.

13. In an automatic phonograph, an electric motor, a switch in circuit therewith, a shaft in driving connection with the motor, a turn-table in driving connection with the shaft, a floating disk for support by and rotation with the turn-table and for carrying a record, a magazine for holding a stack of records, means actuated by the shaft to dispose the magazine horizontally above the floating disk, a lift-plate, means actuated by the shaft to turn the lift plate, means to cause the lift plate to rise as it turns and lift the floating disk off the turn-table high enough to press the record thereon flatly against the bottom record of the stack to impose the load thereon upon the floating disk, manually operable means to move the switch from inoperative to operative relation to the lift plate, and means actuated by the lift plate when raised high enough to cause the load of the stack to be assumed by the floating disk, to operate said switch to break the circuit and arrest the motor.

14. In an automatic phonograph, an electric motor, a switch in circuit therewith, a shaft in driving connection with the motor, a turn-table in driving connection with the shaft, a floating disk for support by and rotation with the turn-table and for carrying a record, a magazine for holding a stack of records, means actuated by the shaft to dispose the magazine horizontally above the floating disk, a lift-plate, means actuated by the shaft to turn the lift plate, means to cause the lift plate to rise as it turns and lift the floating disk off the turn-table high enough to press the record thereon flatly against the bottom record of the stack to impose the load of the stack upon the floating disk, manually operable means to move the switch from inoperative to operative relation to the lift plate, means actuated by the lift plate when raised high enough to cause the load of the stack to be assumed by the floating disk, to operate said switch to break the circuit and arrest the motor, and means to reverse the operation of the switch and complete the circuit as the switch is moved by the manually operated means to inoperative relation to the lift-plate.

15. In an automatic phonograph, a driven turn-table provided with an upstanding axial spindle, a disk fitting centrally and slidably on the spindle and resting on the turn-table when in playing position, a magazine containing records fitting flatwise together in axial alinement, means for swinging the magazine to a position horizontally above the disk with the stack of records standing vertically and in axial alinement with the disk, automatic rotary means to lift the disk off the turn-table and cause the disk to enter the magazine at the bottom thereof and flatly engage and take up the load of the stack of disks within the magazine, and means for automatically arresting the operation of the phonograph to hold the magazine stationary and cause said rotary lifting means to retain the disk in its stack-supporting position.

16. In an automatic phonograph, an electric motor, a shaft driven thereby, a horizontal turn-table on the shaft, a record-carrying disk on the turn-table, a magazine containing a vertical stack of records and disposed above the disk with the stack of records axially alined with the record on the disk, horizontal rotary cam means actuated from the drive shaft at times for lifting the disk off the turn-table when the record is not being played, sufficiently high to cause said record to enter the magazine and flatly engage the bottom record of and lift the stack, a switch in circuit with the motor, and means for automatically opening the switch and arresting the motor when the record elevated and supported by the disk, is carrying the load of the said stack of records.

17. In an automatic phonograph, a horizontal turn-table, a floating disk above and for rotation at times by the turn-table, means for lifting the floating disk relative to the turn-table, a swing frame for movement radially of the axis of the floating disk, a circular magazine pivoted at diametrically opposite points to the swing frame, locking means for holding the magazine in rigid relation to the swing frame, and means for tripping the locking means.

18. In an automatic phonograph, a swing frame, a circular magazine pivoted at diametrically opposite points to the swing frame, locking means for holding the magazine in rigid relation to the swing frame, means for tripping the locking means, and means to rotate the magazine a half revolution relative to the swing frame.

19. In an automatic phonograph, a horizontal turn-table, a floating disk above and for rotation at times by the turn-table, means for lifting the floating disk relative to the turn-table, a swing frame for movement radially of the axis of the floating disk, a circular magazine pivoted at diametrically opposite points on the swing frame, locking means for normally holding the magazine stationary relative to the swing frame, and cam-actuated means for tripping the locking means.

20. In an automatic phonograph, a swing frame, a circular magazine pivoted at diametrically opposite points on the swing frame, locking means for normally holding the magazine stationary relative to the swing frame, cam-actuated means for tripping the locking means, a pawl and ratchet mechanism, and cam-actuated means for causing said mechanism to impart a half revolution to the magazine relative to the swing frame when the locking means is in tripped position, and yielding means to effect relocking of the magazine by the locking means at the end of said half revolution of the magazine.

21. In an automatic phonograph, a magazine for containing a stack of records, spring catches overlying the stack, means to invert the magazine to cause the said catches to underlie the stack, and means to introduce a record into the magazine from below the same until it represses the catches and then lifts the stack until it releases the catches to permit them to snap back to original position and again support the stack including the one introduced from below.

22. In an automatic phonograph, a magazine, a set of movable plates normally projecting into the magazine to underlie and support therein a stack of records, a second set of movable plates in a different plane from the first set and inoperative when the latter is functioning as a support for the records, and means slidable on the magazine for simultaneously operating said plates to withdraw the first set from below the stack and cause the second set to project into the magazine between the bottom record and the record second from the bottom.

23. In an automatic phonograph, a framework, a driven shaft, a turn table rotatable therewith, a floating disk coaxial with and at times resting on and rotated by the turn-table and carrying a disk record, a tone arm, a needle carried thereby for engaging the record and effecting movement of the tone arm, a second shaft, means actuated by movement of the needle as the playing of the record ends, to transmit power to the second shaft, a swing frame on the framework, a magazine carried by said framework, a cam on the second shaft, a lever for operation by the cam, a retractile spring actuated by the lever to swing the swing frame to dispose the magazine over the floating disk and the stack of disk-records in axial alinement with said floating disk, and means for cooperating in the initial part of the movement of the swing frame and for yieldingly opposing the latter part of such movement.

24. In an automatic phonograph, a framework, a driven shaft, a turn table rotatable therewith, a floating disk coaxial with and at times resting on and rotated by the turn-table and carrying a disk record, a tone arm, a needle carried thereby for engaging the record and effecting movement of the tone arm, a second shaft, means actuated by movement of the needle as the playing of the record ends, to transmit power to the second shaft, a swing frame on the framework, a magazine carried by said framework, a cam on the second shaft, a lever for operation by the cam, a retractile spring actuated by the lever to swing the swing frame to dispose the magazine over the floating disk and the stack of disk-records in axial alinement with said floating disk, and bracing means between the swing frame and said lever disposed angularly with relation to said spring to stabilize or regulate the swing frame movement without interfering with the lever movement after the swing movement imparted thereby to the swing frame ends.

25. In an automatic phonograph, a framework, a driven shaft, a turn table rotatable therewith, a floating disk coaxial with and at times resting on and rotated by the turn-table and carrying a disk record, a tone arm, a needle carried thereby for engaging the record and effecting movement of the tone arm, a second shaft, means actuated by movement of the needle as the playing of the record ends, to transmit power to the second shaft, a swing frame on the framework, a magazine carried by said framework, a cam on the second shaft, a lever for operation by the cam, a retractile spring actuated by the lever to swing the swing frame to dispose the magazine over the floating disk and the stack of disk-records in axial alinement with said floating disk, an arm rigid with the swing frame and disposed at an angle to the said spring, and a rod pivotally connected to the lever and pivotally and slidingly connected to said arm, the rod having a shoulder to limit sliding movement in one direction relative to said arm and thereby determine the extent of gravitative movement of the swing frame.

26. In an automatic phonograph, a drive shaft, a second shaft, means for automatically transmitting power from the drive shaft to the second shaft to effect periodic revolution of the latter, a circular magazine pivotally supported and containing a stack of records, a cam on the second shaft, and means actuated by the cam for imparting a half revolution to the magazine.

27. In an automatic phonograph, a drive shaft, a second shaft, means for automatically transmitting power from the drive shaft to the second shaft to effect periodic revolution of the latter, a circular magazine pivotally supported and containing a stack of records, a cam on the second shaft, means actuated by the cam for imparting a half revolution to the magazine, and means to lock the magazine in rigid relation to its support, at the end of such half revolution.

28. In an automatic phonograph, a drive shaft, a horizontal turntable driven thereby, a second shaft, means for automatically transmitting power from the drive shaft to the second shaft to effect periodic revolution of the latter, a circular magazine pivotally supported and containing a stack of records, a cam on the second shaft, means actuated by the cam for imparting a half revolution to the magazine, and means to dispose the magazine horizontally above and in coaxial alinement with the turntable.

29. In an automatic phonograph, a drive shaft, a horizontal turntable driven thereby, a second shaft, means for automatically transmitting power from the drive shaft to the second shaft to effect periodic revolution of the latter, a circular magazine pivotally supported and containing a stack of records, a cam on the second shaft, means actuated by the cam for imparting a half revolution to the magazine, means to dispose the magazine horizontally above and in coaxial alinement with the turntable, means to lift a record vertically upward into the magazine against the bottom record of the stack, and means to retain the lifted record in the magazine.

30. In an automatic phonograph, a drive shaft, a turntable driven thereby, a second shaft, means for automatically transmitting power from the drive shaft to the second shaft to effect periodic revolution of the latter, a circular magazine pivotally supported and containing a stack of records, a cam on the second shaft, means actuated by the cam for imparting a half revolution to the magazine, means to dispose the magazine horizontally above and in coaxial alinement with the turntable, means to lift a record vertically upward into the magazine against the bottom record of the stack, means to retain the lifted record in the magazine, and means to return the magazine to normal or original position.

31. In an automatic phonograph, a drive shaft, a turntable driven thereby, a second shaft, means for automatically transmitting power from the drive shaft to the second shaft to effect periodic revolution of the latter, a swing frame, a circular magazine pivotally supported on the swing frame and containing a stack of records, means locking the magazine against pivotal movement on the swing frame, a cam on the second shaft, means actuated by said cam for unlocking the magazine, a second cam on said shaft, means actuated by the said second cam for imparting a half revolution to the magazine, means to operate the swing frame to dispose the magazine horizontally above and in coaxial alinement with the turntable, means to lift a record vertically upward into the magazine against the bottom record of the stack, means to retain the lifted record in the magazine, means to return the swing frame and magazine to normal or original position, and means to effect a second unlocking action of the magazine.

32. In an automatic phonograph, a drive shaft, a turntable driven thereby, a second shaft, means for automatically transmitting power from the drive shaft to the second shaft to effect periodic revolution of the latter, a swing frame, a circular magazine pivotally supported on the swing frame and containing a stack of records, means locking the magazine against pivotal movement on the swing frame, a cam on the second shaft, means actuated by said cam for unlocking the magazine, a second cam on said shaft, means actuated by the said second cam for imparting a half revolution to the magazine, means to operate the swing frame to dispose the magazine horizontally above and in coaxial alinement with the turntable, means to lift the record vertically upward into the magazine against the bottom record of the stack, means to retain the lifted record in the magazine, means to return the swing frame and magazine to normal or original position, means to effect a second unlocking action of the magazine, and means to effect a second half revolution of the magazine to dispose the record picked up as the topmost record of the stack.

33. In an automatic phonograph, a drive shaft, a turntable driven thereby, a second shaft, means for automatically transmitting power from the drive shaft to the second shaft to effect periodic revolution of the latter, a swing frame a circular magazine pivotally supported on the swing frame and containing a stack of records, means locking the magazine against pivotal movement on the swing frame, a cam on the second shaft, means actuated by said cam for unlocking the magazine, a second cam on said shaft, means actuated by the said second cam for imparting a half revolution to the magazine, means to operate the swing frame to dispose the magazine horizontally above and in coaxial alinement with the turntable, means to lift a record vertically upward into the magazine against the bottom record of the stack, means to retain the lifted record in the magazine, means to return the swing frame and magazine to normal or original position, means to effect a second unlocking action of the magazine, means to effect a second half revolution of the magazine to dispose the record picked up as the topmost record of the stack, and means to cause the locking means to secure the magazine against pivotal operation.

34. In an automatic phonograph, a driven turntable, a floating disk upon and rotated by the turntable, a swing-frame, a magazine carried by the swing-frame and containing a stack of records, means for swinging the frame to dispose the magazine over and the stack of records vertically and in axial alinement with the turntable, a set of swing plates on the magazine and underlying the stack of records, a second set of swing plates on the magazine, and means adapted after the swing frame moves the magazine over the turntable, for simultaneously withdrawing the first set of swing plates from under the stack of records and interposing the second set of swing plates under all of the records except the undermost one to permit it to drop upon said disk.

35. In an automatic phonograph, a driven turntable, a floating disk upon and rotated by the turntable, a swing-frame, a magazine carried by the swing-frame and containing a stack of records, means for swinging the frame to dispose the magazine over and the stack of records vertically and in axial alinement with the turntable, a set of swing plates on the magazine and underlying the stack or records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon said disk, and means for returning the swing frame to its initial position.

36. In an automatic phonograph, a driven turntable, a floating disk upon and rotated by the turntable, a swing-frame, a magazine pivotally carried by the swing-frame and containing a stack of records, means for swinging the frame to dispose the magazine over and the stack of records vertical and in axial alinement with the turntable, a set of swing plates on the magazine and underlying the stack of records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon said disk, means for returning the swing frame to its initial position, movable spring-catches on the magazine normally overhanging the stack of records, and means for turning the magazine a half revolution to inverted position.

37. In an automatic phonograph, a driven turntable, a floating disk upon and rotated by the turntable, a swing-frame, a magazine pivotally carried by the swing-frame and containing a stack of records, means for swinging the frame to dispose the magazine over and the stack of records vertical and in axial alinement with the turntable, a set of swing plates on the magazine and underlying the stack of records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon said disk, means for returning the swing-frame to its initial position, movable spring-catches on the magazine normally overhanging the stack of records, means for turning the magazine a half revolution to inverted position, and means to effect a repeat operation of the swing-frame to dispose the inverted magazine above and axially alined with the floating disk.

38. In an automatic phonograph, a driven turntable, a floating disk upon and rotated by the turntable, a swing-frame, a magazine pivotally carried by the swing-frame and containing a stack of records, means for swinging the frame to dispose the magazine over and the stack of records vertical and in axial alinement with the turntable, a set of swing plates on the magazine and underlying the stack of records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon said disk, means for returning the swing-frame to its initial position, movable spring-catches on the magazine normally overhanging the stack of records, means for turning the magazine a half revolution to inverted position, means to effect a repeat operation of the swing-frame to dispose the inverted magazine above and axially alined with the floating disk, and means for lifting the floating disk off the turntable sufficiently to cause the record thereon to enter the magazine and thereby successively repress and release the catches to permit them to snap under and support the lifted record.

39. In an automatic phonograph, a driven turntable, a floating disk upon and rotated by the turntable, a swing-frame, a magazine pivotally carried by the swing-frame and containing a stack of records, means for swinging the frame to dispose the magazine over and the stack of records vertical and in axial alinement with the turntable, a set of swing plates on the magazine and underlying the stack of records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon the disk, means for returning the swing-frame to its initial position, movable spring-catches on the magazine normally overhanging the stack of records, means for turning the magazine a half revolution to inverted position, means to effect a repeat operation of the swing-frame to dispose the inverted magazine above and axially alined with the floating disk, means for lifting the floating disk off the turntable sufficiently to cause the record thereon to enter the magazine and thereby successively repress and release the catches to permit them to snap under and support the lifted record, and means for relowering the lifting means to redeposit the floating disk upon the turntable.

40. In an automatic phonograph, a driven turntable, a floating disk upon and rotated by the turntable, a swing-frame, a magazine pivotally carried by the swing-frame and containing a stack of records, means for swinging the frame to dispose the magazine over and the stack of records vertical and in axial alinement with the turntable, a set of swing plates on the magazine and underlying the stack of records, a second set of swing plates on the magazine, means adapted after the swing-frame moves the magazine over the turntable, for simultaneously withdrawing the first set of swing plates from under the stack of records and interposing the second set of swing plates under all of the records except the undermost one to permit it to drop upon the disk, means for returning the swing-frame to its initial position, movable spring-catches on the magazine normally overhanging the stack of records, means for turning the magazine a half revolution to inverted position, means to effect a repeat operation of the swing-frame to dispose the inverted magazine above and axially alined with the floating disk, means for lifting the floating disk off the turntable sufficiently to cause the record thereon to enter the magazine and thereby successively repress and release the catches to permit them to snap under and support the lifted record, means for relowering the lifting means to redeposit the floating disk upon the turntable, and yielding means for opposing such relative change of positions of the swing plates and for restoring them to their original relationship to the magazine.

41. A circular magazine, open at top and bottom and provided with wall openings, sets of swing plates in said openings, each set comprising members normally projecting in opposite directions and interiorly and exteriorly relative to the magazine and occupying different horizontal planes, and an oscillatory ring on the magazine provided with two sets of circumferentially extending slots for engagement with the respective sets of swing plates, means for turning the ring in one direction to operate the swing plates and reverse their positions relative to the interior of the magazine and means to turn the ring in the opposite direction to restore the plates to their original positions.

42. In an automatic phonograph, a framework, a drive shaft therein, a turntable, a disk for carrying a record and resting at times on the turntable to be turned thereby, a swing-frame, a record magazine carried thereby, a pull spring connected to the magazine, and means actuated at times by the shaft, for causing the spring to swing the swing-frame a fixed distance to dispose the magazine over the disk and in coaxial alinement therewith.

43. In an automatic phonograph, an oscillatory cylinder-shaped magazine for holding a stack of flat disk records flatly together with their axes alined, a turn-table, a rotatable floating disk axially alined at all times with the turn-table and forming an underlying horizontal support at times for each record for nearly the full area thereof and at times resting on and driven by the turn-table, means for swinging the magazine to a horizontal position over and with its stack of disk records axially alined with the turn-table, and means for lifting the floating disk from the turn-table to break the driving relation and to dispose the supported disk record horizontally within the magazine.

44. In an automatic phonograph, an oscillatory cylinder-shaped magazine for holding a stack of flat disk records flatly together with their axes alined, a turn-table, a rotatable floating disk axially alined at all times with the turn-table and forming an underlying horizontal support at times for each record for nearly the full area thereof and at times resting on and driven by the turn-table, means for swinging the magazine to a horizontal position over and with its stack of disk records axially alined with the turn-table, means for lifting the floating disk from the turn-table to break the driving relation and to dispose the supported disk record horizontally within the magazine, and automatic means for arresting the operation of the phonograph immediately after the disk record is disposed within the magazine and while it is supported therein by the floating disk.

45. In an automatic phonograph, an oscillatory frame, a record disk holding magazine carried by said frame, a driven turn-table, a floating disk forming an underlying support at times for each record disk for nearly the full area thereof and at times resting upon and driven by the turn-table, means for imparting relative approaching movement to the magazine and floating disk sufficient to cause the record disk to enter the magazine, automatic means to underlie the said record disk to hold it in the magazine, means to swing the magazine-carrying frame away from the floating disk, and means to impart a half turn to the magazine preliminary to its next approaching movement relative to the floating disk.

46. In an automatic phonograph, an oscillatory frame, a record disk holding magazine carried by said frame, a driven turn-table, a floating disk forming an underlying support at times for each record disk for nearly the full area thereof and at times resting upon and driven by the turn-table, means for imparting relative approaching movement to the magazine and floating disk sufficient to cause the record disk to enter the magazine, automatic means to underlie the said record disk to hold it in the magazine, means to swing the magazine-carrying frame away from the floating disk, means to impart a half turn to the magazine preliminary to its next approaching movement relative to the floating disk, and means for automatically releasing the bottommost record in the magazine to permit it to drop down and rest flatly upon the floating disk, with its axis in alinement with the axis of the latter.

47. An open-bottom circular magazine provided with wall slots, a set of movable plates pivoted to the magazine wall and occupying certain of said slots and normally underlying and supporting a stack of record disks within the magazine, a second set of movable plates pivoted to the magazine wall and occupying the remainder of said slots, and a rotatable ring encircling the magazine and provided with slots receiving said sets of plates respectively to effect simultaneous movement of both sets, the first set from under the stack and the other set between the bottom record disk and the disk next above, to permit the bottom most record to drop out of the magazine.

48. An open-bottom circular magazine provided with wall slots, a set of movable plates pivoted to the magazine wall and occupying certain of said slots and normally underlying and supporting a stack of record disks within the magazine, a second set of movable plates pivoted to the magazine wall and occupying the remainder of said slots, a rotatable ring encircling the magazine and provided with slots receiving said sets of plates respectively to effect simultaneous movement of both sets, the first set from under the stack and the other set between the bottom record disk and the disk next above, to permit the bottom most record to drop out of the magazine, and means to reverse the operation of said ring to cause the said first set to assume a position under the stack within the magazine and the other set to withdraw from supporting position relative to such stack.

49. In an automatic phonograph, a driven shaft, a turn-table driven therefrom, a second shaft, an oscillatory disk record magazine, power-transmitting connections between the said second shaft and the magazine, for swinging the latter over the turn-table, a floating disk carrying a disk record and resting at times on the turn-table to be rotated thereby, a tone-arm having a needle engaging the disk record and adapted as the playing of the disk record ends to be moved relatively to the center of said disk record by the latter, and means actuated through the said movement of the needle for establishing a driving connection between the driven shaft and said second shaft whereby the magazine is swung to a position directly above the disk record on the floating disk.

50. In an automatic phonograph, a driven shaft, a turn-table driven therefrom, a second shaft, an oscillatory disk record magazine, power transmitting connections between the said second shaft and the magazine, for swinging the latter over the turn-table, a floating disk carrying a disk record and resting at times on the turn-table to be rotated thereby, a tone arm having a needle engaging the disk record and adapted as the playing of the disk record ends to be moved relatively to the center of said disk record by the latter, means actuated through the said movement of the needle for establishing a driving connection between the driven shaft and said second shaft whereby the magazine is swung to a position directly above the disk record on the floating disk, and means for raising the floating disk from the turn-table to cause said floating disk to thrust the played disk record thereon up into the overlying magazine.

51. In an automatic phonograph, a driven shaft, a turn-table driven therefrom, a second shaft, an oscillatory disk record magazine, power transmitting connections between the said second shaft and the magazine, for swinging the latter over the turn-table, a floating disk carrying a disk record and resting at times on the turn-table to be rotated thereby, a tone arm having a needle engaging the disk record and adapted as the playing of the disk record ends to be moved relatively to the center of said disk record by the latter, means actuated through the said movement of the needle for establishing a driving connection between the driven shaft and said second shaft whereby the magazine is swung to a position directly above the disk record on the floating disk, means for raising the floating disk from the turn-table to cause said floating disk to thrust the played disk record thereon up into the overlying magazine, and spring catches on the magazine to underlie the raised disk record to retain it within the magazine.

52. In an automatic phonograph, a driven shaft, a turn-table driven therefrom, a second shaft, an oscillatory disk record magazine, power transmitting connections between the said second shaft and the magazine, for swinging the latter over the turn-table, a floating disk carrying a disk record and resting at times on the turn-table to be rotated thereby, a tone arm having a needle engaging the disk record and adapted as the playing of the disk record ends to be moved relatively to the center of said disk record by the latter, means actuated through the said movement of the needle for establishing a driving connection between the driven shaft and said second shaft whereby the magazine is swung to a position directly above the disk record on the floating disk, means for raising the floating disk from the turn-table to cause said floating disk to thrust the played disk record thereon up into the overlying magazine, spring catches on the magazine to underlie the raised disk record to retain it within the magazine, and means actuated by the second shaft for swinging the magazine from over the turn-table and back to its initial position.

53. In an automatic phonograph, a driven shaft, a turn-table driven therefrom, a second shaft, an oscillatory disk record magazine, power transmitting connections between the said second shaft and the magazine, for swinging the latter over the turn-table, a floating disk carrying a disk record and resting at times on the turn-table to be rotated thereby, a tone arm having a needle engaging the disk record and adapted as the playing of the disk record ends to be moved relatively to the center of said disk record by the latter, means actuated through the said movement of the needle for establishing a driving connection between the driven shaft and said second shaft whereby the magazine is swung to a position directly above the disk record on the floating disk, means for raising the floating disk from the turn-table to cause said floating disk to thrust the played disk record thereon up into the overlying magazine, spring catches on the magazine to underlie the raised disk record to retain it within the magazine, means actuated by the second shaft for swinging the magazine from over the turn-table and back to its initial position, and means to break the driving relation between the driven shaft and the second shaft as the magazine attains its initial position.

54. A cylindrical magazine for holding a stack of playing records for successive discharge downward, and provided with sets of wall slots, each set consisting of slots in different vertical planes, a set of plates pivoted in certain slots of the magazine for normally underlying and supporting the stack of disk records within the magazine, a second set of plates spaced horizontally upward about the thickness of a disk record, from the first named plates and normally outside the marginal plane of the disk records and pivotally occupying the other wall slots, and means for simultaneously causing said sets of plates to reverse their position relative to the stack of disk records, to permit the bottommost disk record to drop out of the magazine and the next lowest disk record to rest upon the second set of plates.

WILLIAM T. CARNES.